US00RE34259E

United States Patent [19]

Rockenfeller

[11] E Patent Number: Re. 34,259

[45] Reissued Date of Patent: May 25, 1993

[54] SYSTEM FOR LOW TEMPERATURE REFRIGERATION AND CHILL STORAGE USING AMMONIATED COMPLEX COMPOUNDS

[75] Inventor: Uwe Rockenfeller, Boulder City, Nev.

[73] Assignee: Rocky Research, Boulder City, Nev.

[21] Appl. No.: 734,290

[22] Filed: Jul. 17, 1991

Related U.S. Patent Documents

Reissue of:

[64] Patent No.: 4,848,994
Issued: Jul. 18, 1989
Appl. No.: 162,016
Filed: Feb. 29, 1988

U.S. Applications:

[63] Continuation-in-part of Ser. No. 115,820, Nov. 2, 1987, Pat. No. 4,822,391.

[51] Int. Cl.[5] ..... F25D 5/00

[52] U.S. Cl. ..... 62/4; 62/112; 252/71

[58] Field of Search ..... 62/4, 112; 252/71

[56] References Cited

U.S. PATENT DOCUMENTS

| | | | |
|---|---|---|---|
| 2,496,459 | 2/1950 | Kleen . | |
| 3,957,472 | 5/1976 | Donnelly | 62/4 |
| 4,010,620 | 3/1977 | Telkes | 62/4 |
| 4,044,821 | 8/1977 | Fletcher | 62/4 |
| 4,563,295 | 1/1986 | Erickson | 252/71 |
| 4,944,159 | 7/1990 | Crozat | 62/112 |
| 4,976,117 | 12/1990 | Crozat et al. | 62/480 |

FOREIGN PATENT DOCUMENTS

| | | |
|---|---|---|
| 6837767 | 6/1930 | France . |
| 751102 | 8/1933 | France . |
| 766022 | 6/1934 | France . |
| 453347 | 9/1936 | United Kingdom . |

*Primary Examiner*—Ronald C. Capossela
*Attorney, Agent, or Firm*—Jerry R. Seiler

[57] ABSTRACT

An improved heat exchange system incorporates the cooling created by using a metal salt/ammonia ligand complex compound which is alternately heated and cooled to alternately desorb and adsorb, respectively, the ammonia creating useful cooling or refrigeration in the temperature range of between −65° C. to 15° C.

16 Claims, No Drawings

SYSTEM FOR LOW TEMPERATURE REFRIGERATION AND CHILL STORAGE USING AMMONIATED COMPLEX COMPOUNDS

Matter enclosed in heavy brackets [ ] appears in the original patent but forms no part of this reissue specification; matter printed in italics indicates the additions made by reissue.

REFERENCE TO PRIOR APPLICATIONS

This application is a continuation-in-part of application Ser. No. 115,820, filed Nov. 2, 1987, now U.S. Pat. No. 4,822,391 the description of which is incorporated herein by reference.

BACKGROUND OF THE INVENTION

In my aforesaid co-pending application, there are described processes and apparatus for transferring energy utilizing complex compounds of ligands and relatively inexpensive salts including ammoniated halide salts of alkali and alkaline earth metals in the presence of suitable liquids. According to the present invention, it has been found that specific ammoniated complex compounds are ideal for energy storage and refrigeration in the temperature ranges of between about −65° C. and 15° C. It is to the use of such complex compounds for energy storage and refrigeration that the present invention is directed.

SUMMARY OF THE INVENTION

The present invention comprises the use of complex ammoniated salts for chill storage or refrigeration at temperatures below about 15° C. The complexes are used in system in which the salt alternately adsorbs and desorbs the ammonia ligand to alternately reject or store heat, respectively. In such a system, a single complex may be alone, or, combinations of different salt complexes may be used. The complex compounds may be used in a dry system, or, in another embodiment, combined with selected liquids having a boiling point above about 60° C. and a melting point below about +5° C.

DETAILED DESCRIPTION OF THE INVENTION

The specific ammoniated complex compounds of the invention are selected from the following groups of salts:

(1) an alkaline earth metal chloride, bromide or chlorate salt, (2) a metal chloride, bromide or chlorate salt in which the metal is chromium, manganese, iron, cobalt, nickel, cadmium, tantalum or rhenium, (3) a double chloride salt selected from $NH_4AlCl_4$ $NaAlCl_4$, $KAlCl_4$, $(NH_4)^2ZNCl_4$, $(NH_4)_3$ $ZNCl_5$, $K_2ZnCl_4$ and $CsCuCl_3$, $K_2FeCl_5$, and (4) sodium bromide or ammonium chloride.

Within each of these groups of salts, the ammoniated complex is one in which ammonia is present between specific lower and upper limits. At any given time during the reaction process, the amount of ligand present in the complex will depend on the state of adsorption or desorption. Each complex will be used to store energy and refrigerate in a specific temperature range determined by the vapor pressure equilibria of the adsorbing complex and the ammonia vapor pressure (where a single complex is used) or the corresponding desorbing complex.

Within each group, the preferred specific salts, the limits of the ligand in the complex and the temperature ranges in which each complex is used for thermal energy storage and refrigeration, according to the invention, and given in the following table in which X is zero or a positive number, including a reaction, between the limits set forth:

| Group | Complex | Temperature range, °C. | Value of X |
|---|---|---|---|
| (1) | $BeCl_2.X(NH_3)$ | −10 to −65 | 2–4 |
| | $MgCl_2.X(NH_3)$ | 0 to −60 | 2–6 |
| | $MgBr_2.X(NH_3)$ | 0 to −65 | 2–6 |
| | $Mg(ClO_4)_2.X(NH_3)$ | 0 to −65 | 0–6 |
| | $CaCl_2.X(NH_3)$ | 0 to −30 | 2–4 |
| | $CaCl_2.X(NH_3)$ | 10 to −20 | 4–8 |
| | $CaBr_2.X(NH_3)$ | 0 to −40 | 2–6 |
| | $Ca(ClO_4)_2.X(NH_3)$ | 0 to −45 | 2–6 |
| | $SrCl_2.X(NH_3)$ | 10 to −30 | 1–8 |
| | $Sr(ClO_4)_2.X(NH_3)$ | 0 to −40 | 0–6 |
| | $BaBr_2.X(NH_3)$ | 10 to −30 | 4–8 |
| | $BaCl_2.X(NH_3)$ | 10 to −25 | 0–8 |
| (2) | $MnCl_2.X(NH_3)$ | 0 to −40 | 2–6 |
| | $MnBr_2.X(NH_3)$ | 0 to −50 | 2–6 |
| | $FeCl_2.X(NH_3)$ | 0 to −45 | 2–6 |
| | $FeBr_2.X(NH_3)$ | 0 to −50 | 2–6 |
| | $CoCl_2.X(NH_3)$ | 0 to −60 | 2–6 |
| | $CoBr_2.X(NH_3)$ | 0 to −60 | 2–6 |
| | $NiCl_2.X(NH_3)$ | 0 to −65 | 2–6 |
| | $NiBr_2.X(NH_3)$ | 0 to −65 | 2–6 |
| | $Ni(ClO_3)_2.X(NH_3)$ | 0 to −40 | 0–6 |
| | $CrCl_2.X(NH_3)$ | 0 to −60 | 0–3, 3–6 |
| | $CdBr_2.X(NH_3)$ | 0 to −40 | 2–6 |
| | $TaCl_5.X(NH_3)$ | 10 to −30 | 0–7 |
| | $ReCl_3.X(NH_3)$ | 5 to −40 | 0–6 |
| | $ReBr_3.X(NH_3)$ | 5 to −40 | 0–7 |
| | $SnCl_2.X(NH_3)$ | 0 to −60 | 0–2.5 |
| (3) | $NH_4AlCl_4.X(NH_3)$ | to −65 | 0–6 |
| | $NaAlCl_4.X(NH_3)$ | to −65 | 0–6 |
| | $KAlCl_4.X(NH_3)$ | 0 to −65 | 0–6 |
| | $(NH_4)_2ZnCl_4.X(NH_3)$ | 0 to −60 | 0–4 |
| | $(NH_4)_3ZnCl_5.X(NH_3)$ | 0 to −45 | 0–6 |
| | $K_2ZnCl_4.X(NH_3)$ | 0 to −40 | 0–5 |
| | $K_2ZnCl_4.X(NH_3)$ | 0 to −35 | 5–12 |
| | $CaCuCl_3.X(NH_3)$ | 0 to −55 | 2–5 |
| | $K_2FeCl_5.X(NH_3)$ | 0 to −55 | 2–5 |
| (4) | $NH_4Cl.X(NH_3)$ | 15 to −20 | 0–3 |
| | $NaBr.X(NH_3)$ | 15 to −15 | 0–5.25 |

When alternately heated and cooled, portions of the ammonia ligand moiety are desorbed and absorbed, respectively, within the aforesaid limits of X for the respective complex compounds. The cold temperature range described above, in which each individual complex compound is most effective is different with each range being a function of the chemisorption characteristics of the respective complex. Thus, the rates of adsorption and desorption will vary, depending on the specific temperature and pressure in which the system is operated. It is to be understood that the aforesaid temperature limits are the temperatures created by desorption of ammonia in a corresponding complex or by evaporation of free ammonia. The salts themselves are subjected to heat rejection temperatures in the usual range of between about 20° and about 50° C. to force the cooling or refrigeration in the aforesaid ranges. Normally, in the use of such complex compounds for thermal energy storage and refrigeration, pressures between about 0.001 and about 50 atmospheres are used, and the most effective pressures will be selected by those skilled in the art.

When the complex compounds are used for thermal energy storage or refrigeration in the dry state, dry bed configurations incorporate a layer of desired thickness, for example, between about 1 and about 40 mm for refrigeration systems and between about 2 and about 60 mm for thermal storage systems, with the bed in a suitable vessel provided with heat exchange components as well as means for heating and cooling the complex compounds therein and for recovering energy and particularly cooling which occurs during the adsorption phase of the reaction by means of ligand evaporation or by desorption of the corresponding complex. In the desorption phase, the complex compounds are heated and ammonia ligand is released. During the adsorption phase, heat is rejected, and the thermal energy differential is recovered by suitable heat exchangers present. Various heat exchange means may be used for alternately heating or cooling the compounds or in recovering the thermal energy transferred by the respective reactions, for example by providing heat pump evaporator or condenser coils or tubing to the environment created by the respective reactions. Thus, such a process is particularly valuable for refrigeration systems and for cold or chill storage apparatus. The heat generated in the exothermic phase of the reaction, may also be used for heat pump systems, or it may be recovered and used for any heating requirement, or it may be simply used as waste heat or dumped to atmosphere.

In an alternative embodiment, instead of using the complex compounds in the dry state as previously described, they may be incorporated in a liquid system, the use of a liquid offering advantages in a manner as described in my aforesaid co-pending patent application the description of which is incorporated herein by reference. The specific liquid used is one which does not significantly dissolve the complex and does not chemically react with the adsorbent. The purpose of the liquid is to function as a holding medium to provide a greatly extended surface for the adsorbent, with the small crystalline particles of the complex compound disbursed therein. Thus, the liquid actually acts as a catalyst, by reducing the activation energy barrier thereby minimizing the pressure differential required to drive the adsorption and desorption reactions.

The preferred groups of organic liquids comprise alcohols, alcohol-ethers, glycol-ethers, esters, ketones and pyridines. Since these liquids are to operate in the temperature ranges designed for ammonia evaporation and condensation, between about −45° and about 50° C., the liquid has a boiling point above about 60° C. and a melting point below about 5° C. Preferred liquids are aliphatic alcohols between about 4 and about 12 carbon atoms, lower alkyl acetates, lower alkyl acetoacetates, polyalkylene glycol alkyl ether acetates, polyalkylene glycol dialkyl ethers, butyroloctone and collidine and mixtures of these liquids with water.

Of the alcohols, the lower alcohols within the aforesaid range are least preferred, with those having six or more carbon atoms being more preferred because the salt of the complex compounds tends to be less soluble although this solubility will vary with different ones of the aforesaid complexes of the invention. The specifically preferred liquids within the aforesaid groups include n-heptanol, octanol, isopropyl acetate, ethyl acetoacetate, ethylene glycol, diethylene glycol, diethylene glycol monobutyl ether acetate, diethylene glycol dimethyl ether, tetraethylene glycol dimethyl ether, diethylene glycol diethyl ether, and diethylene glycol dibutyl ether as well as butyroloctone and collidine. The use of these liquids with the various complex compounds as well as other useful liquids are described in my aforesaid application including the systems and apparatus therein and are incorporated herein by reference. Other systems known to those skilled in the art may also be used.

Specific storage systems used to take advantage of chemisorption reactions of the aforesaid complexes include stand-alone chill storage systems designed as indirect coupled heat actuated chiller/storage systems, or a compressor may be used to compress the ammonia ligand which is in direct contact with the complex. In such a system, the liquid ammonia ligand is expanded in an expansion valve and evaporates in the evaporator to yield the cooling effect. This operating mode allows for a direct contact integration of the storage system into an ammonia refrigeration plant. At the same time, the vapor pressure of the ammonia at the low evaporator temperature is still higher than the complex compound vapor pressure at the high heat rejection temperature maintained by an evaporative condenser. As a result, ammonia leaves the ligand storage tank, evaporates, and undergoes an exothermic adsorption with the complex compound. In charging such a system, ammonia gas flow is reversed by raising the ammonia pressure sufficiently high to condense the ultimately directing the liquid back into the ligand storage tank. If a compressor is used to charge the system, ammonia is drawn out of the complex and compressed to a pressure adequate for ammonia condensation in a condenser. The complex compound may be heated with a chiller reject heat thereby maintaining small compression ratios and the condenser may be maintained a low temperature by means of the chiller evaporator. The complex vapor pressure may also be raised by applying waste or prime heat, if available whereby the condenser temperature of the storage system can be easily maintained by the chiller thus embodying a heat-activated chiller.

Other suitable systems include an integrated indirect contact chill storage system, for example, using an indirect coupled chiller activated complex compound of the chilled storage system in which the charging process is performed by the chiller. Condenser heat of the chiller maintained a high complex temperature and the chiller evaporator is coupled with the storage system condenser to maintain a low ligand condensation temperature. In yet other systems, combinations of the various complex salt/ligand compounds may be used, with a different salt/ammonia complex in different vessels, which are sequentially heated and cooled, with the gaseous ligand selectively directed between the vessels to take advantage of the thermal energy transfer between the adsorption and desorption reactions. The system may also be operated as a chiller such that the ammonia ligand is desorbed from the complex by means of prime or waste heat. Such chillers can be designed as single stage configurations using one complex compound and ammonia condensation/evaporation, or using two paired complex compounds in corresponding adsorption/desorption reactions, and in Double Effect and Generator Absorber Heat Exchange (GAX) versions known in the art. Such systems as well as others utilizing the complex compounds of the invention to achieve the desired storage and heat exchange effects will be evident to those skilled in the art.

I claim:

1. [In a] *A* heat exchange system containing a *liquid and a complex compound for being mixed therewith and comprising a heat exchange surface exposed to said liquid and/or said mixture, said* complex compound consisting of a metal salt and ammonia for being alternately heated and cooled to alternately desorb and adsorb, respectively, at least a portion of said ammonia, [the improvement comprising] said metal salt being selected from the group consisting of (a) an alkaline earth metal chloride, bromide or chlorate salt, (b) a metal chloride, bromide or [chloride] *chlorate* salt in which the metal is chromium, manganese, iron, cobalt, nickel, cadmium, tantalum, [or] rhenium *or tin,*

(c) a double chloride salt selected from $NH_4AlCl_4$, $NaAlCl_4$, $KAlCl_4$, $(NH_4)_2ZnCl_4$, $(NH_4)_3ZnCl_5$, $K_2ZnCl_4$, $CsCuCl_3$, and $K_2FeCl_5$, and (d) sodium bromide or ammonium chloride[.], *and said liquid selected from the group consisting of alcohols, alcohol-ethers, glycol-ethers, esters, ketones and pyridines.*

2. The system of claim 1 wherein said complex compound is selected from the group consisting of the following complex compounds and wherein said complex compound is alternately heated and cooled to alternately desorb and adsorb, respectively, at least a portion of the ammonia moiety thereof between numerical limits and cause refrigerating [desorption and] ligand evaporation in the temperature range as follows:

$BeCl_2 \cdot X(NH_3)$, wherein X is between 2 and 4 and said temperature range is between −10 and −65° C., $MgCl_2 \cdot X(NH_3)$ wherein X is between 2 and 6 and said temperature range is between 0 and −60° C., $MgBr_2 \cdot X(NH_3)$, wherein X is between 2 and 6 and said temperature range is between 0 and −65° C., $Mg(ClO_4)_2 \cdot X(NH_3)$, wherein X is between 0 and −6 and said temperature range is between 0 and −65° C., $CaCl_2 \cdot X(NH_3)$, wherein X is between 2 and 4 and said temperature range is between 0 and −30° C., $CaCl_2 \cdot X(NH_3)$, wherein X is between 4 and 8 and said temperature range is between 10 and −20° C., $CaBr_2 \cdot X(NH_3)$, wherein X is between 2 and 6 and said temperature range is between 0 and −40° C., $Ca(ClO_4)_2 \cdot X(NH_3)$, wherein X is between 2 and 6 and said temperature range is between 0 and −45° C., $SrCl_2 \cdot X(NH_3)$, wherein X is between 1 and 8 and said temperature range is between 10 and −30° C., $SrBr_2 \cdot X(NH_3)$, wherein X is between 2 and 8 and said temperature range is between 0 and −40° C., $Sr(ClO_2) \cdot X(NH_3)$, wherein X is between 0 and 6 and said temperature range is between 0 and −40° C., $BaBr_2 \cdot X(NH_3)$, wherein X is between 4 and 8 and said temperature range is between 10 and −30° C., $BaCl_2 \cdot X(NH_3)$, wherein X is between 0 and 8 and said temperature range is between 10 and −25° C., $MnCl_2 \cdot X(NH_3)$, wherein X is between 2 and 6 and said temperature range is between 0 and −40° C., $MnBr_2 \cdot X(NH_3)$, wherein X is between 2 and 6 and said temperature range is between 0 and −50° C., $FeCl_2 \cdot X(NH_3)$, wherein X is between 3 and 6 and said temperature range is between 0 and −45° C., $FeBr_2 \cdot X(NH_3)$, wherein X is between 2 and 6 and said temperature range is between 0 and −50° C., $CoCl_2 \cdot X(NH_3)$, wherein X is between 2 and 6 and said temperature range is between 0 and −60° C., $CoBr_2 \cdot X(NH_3)$, wherein X is between 2 and 6 and said temperature range is between 0 and −60° C., $NiCl_2 \cdot X(NH_3)$, wherein X is between 2 and 6 and said temperature range is between 0 and −65° C., $NiBr_2 \cdot X(NH_3)$, wherein X is between 2 and 6 and said temperature range is between 0 and −65° C., $Ni(ClO_3)_2 \cdot X(NH_3)$, wherein X is between 0 and 6 and said temperature range is between 0 and −40° C., $CrCl_2 \cdot X(NH_3)$, wherein X is between 0 and 3 and between 3 and 6 and said temperature range is between 0 and −60° C., $CdBr_2 \cdot X(NH_3)$, wherein X is between 2 and 6 and said temperature range is between 0 and −40° C., $TaCl_3 \cdot X(NH_3)$, wherein X is between 0 and 7 and said temperature range is between 10 and −30° C., $ReCl_3 \cdot X(NH_3)$, wherein X is between 0 and 6 and said temperature range is between 5 and −40° C., $ReBr_3 \cdot X(NH_3)$, wherein X is between 0 and 7 and said temperature range is between 5 and −40° C., $SnCl_2 \cdot X(NH_3)$, wherein X is between 0 and 2.5 and said temperature range is between 0 and −60° C., $NH_4AlCl_4 \cdot X(NH_3)$, wherein X is between 0 and 6 and said temperature range is between 0 and −65° C., $NaAlCl_4 \cdot X(NH_3)$, wherein X is between 0 and 6 and said temperature range is between 0 and −65° C., $KAlCl_4 \cdot X(NH_3)$, wherein X is between 0 and 6 and said temperature range is between 0 and −65° C., $(NH_4)_2ZnCl_4 \cdot X(NH_3)$, wherein X is between 0 and 4 and said temperature range is between 0 and −60° C., $(NH_4)_3ZnCl_5 \cdot X(NH_3)$, wherein X is between 0 and 6 and said temperature range is between 0 and −45° C., $K_2ZnCl_4 \cdot X(NH_3)$, wherein X is between 0 and 5 and said temperature range is between 0 and −40° C., $K_2ZnCl_4 \cdot X(NH_3)$, wherein X is between 5 and 12 and said temperature range is between 0 and −35° C., $CsCuCl_3 \cdot X(MH_3)$, wherein X is between 2 and 5 and said temperature range is between 0 and −55° C., $K_2FeCl_5 \cdot X(NH_3)$, wherein X is between 2 and 5 and said temperature range is between 0 and −55° C., $NH_4Cl \cdot X(NH_3)$, wherein X is between 0 and 3 and said temperature range is between 15 and −20° C., and $NaBr \cdot X(NH_3)$, wherein X is between 0 and 5.25 and said temperature range is between 15 and −15° C.

3. The system of claim 2 [including a liquid therein in which] wherein said complex compound is disbursed[,] *in* said liquid [selected from the group consisting of alcohols, alcohol-ethers, glycol-ethyers, esters, ketones and pyridines].

4. The system of claim [3] *2*, wherein said liquid is selected from the group consisting of aliphatic alcohols having between about 4 and about 12 carbon atoms, lower alkyl acetates, lower alkyl acetoacetates, alkylene glycols, polyalkylene glycol alkyl ether acetates, alkylene glycol ethers, polyalkylene glycol dialkyl ether, dialkyl sebecates, dialkyl phthalates, butyrolactone and collidine, said liquid having a boiling point above about 60° C., and a melting point below about 5° C.

5. The system of claim 2, wherein said liquid is selected from the group consisting of n-heptanol, octanol, isopropyl acetate, ethyl acetoacetate, ethylene glycol, diethylene glycol, diethylene glycol monobutyl ether acetate, diethylene glycol dimethyl ether, tetraethylene glycol dimethyl ether, diethylene glycol diethyl ether, diethylene glycol dibutyl ether, [butyroloctone] *butyrolactone* and collidine.

6. A method for storage and recovery of thermal energy or refrigeration at temperatures between about −65 and 15° C. comprising alternately heating and cooling a complex compound consisting essentially of a metal salt and ammonia causing refrigerating [desorption and] ligand evaporation at temperatures between the following temperature limits, respectively to alternately desorb and adsorb, respectively at least a portion of the ammonia moiety thereof between the following numerical limits, said complex compound selected from the group consisting of:

$BeCl_2 \cdot X(NH_3)$, wherein X is between 2 and 4 and said temperature range is between −10 and −65° C., $MgCl_2 \cdot X(NH_3)$, wherein X is between 2 and 6 and said temperature range is between 0 and −60° C., $MgBr_2 \cdot X(NH_3)$, wherein X is between 2 and 6 and said temperature range is between 0 and −65° C., $Mg(ClO_4)_2 \cdot X(NH_3)$, wherein X is between 0 and 6 and said temperature range is between 0 and −65° C.,

[$CaCl_2 \cdot X(NH_3)$, wherein X is between 2 and 4 and said temperature range is between 0 and −30° C., $CaCl_2 \cdot X(NH_3)$, wherein X is between 4 and 8 and said temperature range is between 10 and −20° C., $CaBr_2 \cdot X(NH_3)$, wherein X is between 2 and 6 and said temperature range is between 0 and −40° C.,]

$Ca(ClO_4)_2 \cdot X(NH_3)$, wherein X is between 2 and 6 and said temperature range is between 0 and −45° C.,

[$SrCl_2 \cdot X(NH_3)$, wherein X is between 1 and 8 and said temperature range is between 10 and −30° C., $SrBr_2 \cdot X(NH_3)$, wherein X is between 2 and 8 and said temperature range is between 0 and −40° C.,]

$Sr(ClO_4)_2 \cdot X(NH_3$, wherein X is between 0 and 6 and said temperature range is between 0 and −40° C., $BaBr_2 \cdot X(NH_3)$, wherein X is between 4 and 8 and said temperature range is between 10 and −30° C.,

[$BaCl_2 \cdot X(NH_3)$, wherein X is between 0 and 8 and said temperature range is between 10 and −25° C., $MnCl_2 \cdot X(NH_3)$, wherein X is between 2 and 6 and said temperature range is between 0 and −40° C.,]

$MnBr_2 \cdot X(NH_3)$, wherein X is between 2 and 6 and said temperature range is between 0 and −50° C.,

[$FeCl_2 \cdot X(NH_3)$, wherein X is between 2 and 6 and said temperature range is between 0 and −45° C.,]

$FeBr_2 \cdot X(NH_3)$, wherein X is between 2 and 6 and said temperature range is between 0 and −50° C., $CoCl_2 \cdot X(NH_3)$, wherein X is between 2 and 6 and said temperature range is between 0 and −60° C., $CoBr_2 \cdot X(NH_3)$, wherein X is between 2 and 6 and said temperature range is between 0 and −60° C.,

[$NiCl_2 \cdot X(NH_3)$, wherein X is between 2 and 6 and said temperature range is between 0 and −65° C.,]

$NiBr_2 \cdot X(NH_3)$, wherein X is between 2 and 6 and said temperature range is between 0 and −65° C., $Ni(ClO_3)_2 \cdot X(NH_3)$, wherein X is between 0 and 6 and said temperature range is between 0 and −40° C., $CrCl_2 \cdot X(NH_3)$, wherein X is between 0 and 3 and between 3 and 6 and said temperature range is between 0 and −60° C., $CdBr_2 \cdot X(NH_3)$, wherein X is between 2 and 6 and said temperature range is between 0 and −40°0 C., $TaCl_5 \cdot X(NH_3)$, wherein X is between 0 and 7 and said temperature range is between 10 and −30° C., $ReCl_3 \cdot X(NH_3)$, wherein X is between 0 and 6 and said temperature range is between 5 and −40° C., $ReBr_3 \cdot X(NH_3)$, wherein X is between 0 and 7 and said temperature range is between 5 and −40° C., $SnCl_2 \cdot X(NH_3)$, wherein X is between 0 and 2.5 and said temperature range is between 0 and −60° C., $NH_4AlCl_4 \cdot X(NH_3)$, wherein X is between 0 and 6 and said temperature range is between 0 and −65° C., $NaAlCl_4 \cdot X(NH_3)$, wherein X is between 0 and 6 and said temperature range is between 0 and −65° C., $KAlCl_4 \cdot X(NH_3)$, wherein X is between 0 and 6 and said temperature range is between 0 and −65° C., $(NH_4)_2ZnCl_4 \cdot X(NH_3)$, wherein X is between 0 and 4 and said temperature range is between 0 and −60° C., $(NH_4)_3ZnCl_5 \cdot X(NH_3)$, wherein X is between 0 and 6 and said temperature range is between 0 and −45° C., $K_2ZnCl_4 \cdot X(NH_3)$, wherein X is between 0 and 5 and said temperature range is between 0 and −40° C., $K_2ZnCl_4 \cdot X(NH_3)$, wherein X is between 5 and 12 and said temperature range is between 0 and −35° C., $CsCuCl_3 \cdot X(NH_3)$, wherein X is between 2 and 5 and said temperature range is between 0 and −55° C., $K_2FeCl_5 \cdot X(NH_3)$, wherein X is between 2 and 5 and said temperature range is between 0 and −55° C., $NH_4Cl \cdot X(NH_3)$, wherein X is between 0 and 3 and said temperature range is between 15 and −20° C., and $NaBr \cdot X(NH_3)$, wherein X is between 0 and 5.25 and said temperature range is between 15 and −15° C., 7. A method for storage and recovery of thermal energy or refrigeration at temperatures between about −65° C. and about 15° C. comprising *mixing a complex compound consisting of a metal salt and ammonia with a liquid selected from the group consisting of alcohols, alcohol-ethers, glycol-ethers, esters, ketones and pyridines, exposing said mixture and/or said liquid to a heat exchange surface, and* alternatively heating and cooling [a] *said* complex compound [consisting of a metal salt and ammonia] to alternately desorb and adsorb, respectively, at least a portion of said ammonia, and wherein said metal salt is selected from the group consisting of (a) an alkaline earth metal chloride, bromide or chlorate salt, (b) a metal chloride, bromide or chlorate salt in which the metal is chromium, manganese, iron, cobalt, nickel, cadmium, tantalum, [or] rhenium *or tin,*

(c) a double chloride salt selected from $NH_4AlCl_4$, $NaAlCl_4$, $KAlCl_4$, $(NH_4)_2ZnCl_4$, $(NH_4)_3ZnCl_4$, $CsCuCl_3$, and $K_2FeCl_5$, and (d) sodium bromide or ammonium chloride.

8. The method of claim 7 wherein said heating and cooling is carried out in a heat exchange vessel.

9. The method of claim 8 comprising alternately directing said ammonia between the heat exchange vessel and an ammonia storage vessel.

10. The method of claim 7 comprising introducing a different one of said metal salts into different heat exchange vessels, respectively, alternately adsorbing and desorbing said ammonia from said different metal salts, and directing said ammonia between said heat exchange vessels.

[11. The method of claim 7 comprising disbursing said complex compound in a liquid selected from the group consisting of alcohols, alcohol-ethers, glycol-ethers, esters, ketones and pyridines.]

12. A compressor charged thermal energy storage system containing a complex compound consisting of a metal salt and ammonia, wherein said complex compound is selected from the group consisting of the following complex compounds, wherein a compressor is used to draw ammonia from said complex compound and to compress the ammonia for condensation, and wherein said complex compound is alternately heated and cooled to alternately desorb and adsorb, respectively, at least a portion of the ammonia moiety thereof between numerical limits to recover thermal energy in the temperature range as follows:

$BeCl_2 \cdot X(NH_3)$, wherein X is between 2 and 4 and said temperature range is between −10° and −65° C., $MgCl_2 \cdot X(NH_3)$ wherein X is between 2 and 6 and said temperature range is between 0° and −60° C., $MgBr_2 \cdot X(NH_3)$, wherein X is between 2 and 6 and said temperature range is between 0° and −65° C., $Mg(ClO_4)_2 \cdot X(NH_3)$, wherein X is between 0 and −6 and said temperature range is between 0° and −65° C., $CaCl_2 \cdot X(NH_3)$, wherein X is between 2 and 4 and said temperature range is between 0° and −30° C., $CaCl_2 \cdot X(NH_3)$, wherein X is between 4 and 8 and said temperature range is between 10° and −20° C., $CaBr_2 \cdot X(NH_3)$, wherein X is between 2 and 6 and said temperature range is between 0° and −40° C., $Ca(ClO_4)_2 \cdot X(NH_3)$, wherein X is between 2 and 6 and said temperature range is between 0° and −45° C., $SrCl_2 \cdot X(NH_3)$, wherein X is between 1 and 8 and said temperature range is between 10° and −30° C., $SrBr_2 \cdot X(NH_3)$, wherein X is between 2 and 8 and said temperature range is between 0° and −40° C., $Sr(ClO_2) \cdot X(NH_3)$, wherein X is between 0 and 6 and said temperature range is between 0° and −40° C., $BaBr_2 \cdot X(NH_3)$, wherein X is between 4 and 8 and said temperature range is between 10° and −30° C., $BaCl_2 \cdot X(NH_3)$, wherein X is between 0 and 8 and said temperature range is between 10° and −25° C., $MnCl_2 \cdot X(NH_3)$, wherein X is between 2 and 6 and said temperature range is between 0° and −40 ° C., $MnBr_2 \cdot X(NH_3)$, wherein X is between 2 and 6 and said temperature range is between 0° and −50° C., $FeCl_2 \cdot X(NH_3)$, wherein X is between 3 and 6 and said temperature range is between 0° and −45° C., $FeBr_2 \cdot X(NH_3)$, wherein X is between 2 and 6 and said temperature range is between 0° and −50° C., $CoCl_2 \cdot X(NH_3)$, wherein X is between 2 and 6 and said temperature range is between 0° and −60° C., $CoBr_2 \cdot X(NH_3)$, wherein X is between 2 and 6 and said temperature range is between 0° and −60° C., $NiCl_2 \cdot X(NH_3)$, wherein X is between 2 and 6 and said temperature range is between 0° and −65° C., $NiBr_2 \cdot X(NH_3)$, wherein X is between 2 and 6 and said temperature range is between 0° and −65° C., $Ni(ClO_3)_2 \cdot X(NH_3)$, wherein X is between 0 and 6 and said temperature range is between 0° and −40° C., $CrCl_2 \cdot X(NH_3)$, wherein X is between 0 and 3 and between 3 and 6 and said temperature range is between 0° and −60° C., $CdBr_2 \cdot X(NH_3)$, wherein X is between 2 and 6 and said temperature range is between 0° and −40° C., $TaCl_5 \cdot X(NH_3)$, wherein X is between 0 and 7 and said temperature range is between 10° and −30° C., $ReCl_3 \cdot X(NH_3)$, wherein X is between 0 and 6 and said temperature range is between 5° and −40° C., $ReBr_3 \cdot X(NH_3)$, wherein X is between 0 and 7 and said temperature range is between 5° and −40° C., $SnCl_2 \cdot X(NH_3)$, wherein X is between 0 and 2.5 and said temperature range is between 0° and −60° C., $NH_4AlCl_4 \cdot X(NH_3)$, wherein X is between 0 and 6 and said temperature range is between 0° and −65° C., $NaAlCl_4 \cdot X(NH_3)$, wherein X is between 0 and 6 and said temperature range is between 0° and −65° C., $KAlCl_4 \cdot X(NH_3)$, wherein X is between 0 and 6 and said temperature range is between 0° and −65° C., $(NH_4)_2ZnCl_4 \cdot X(NH_3)$, wherein X is between 0 and 4 and said temperature range is between 0° and −60° C., $(NH_4)_3ZnCl_5 \cdot X(NH_3)$, wherein X is between 0 and 6 and said temperature range is between 0° and −45° C., $K_2ZnCl_4 \cdot X(NH_3)$, wherein X is between 0 and 5 and said temperature range is between 0° and −40° C., $K_2ZnCl_4 \cdot X(NH_3)$, wherein X is between 5 and 12 and said temperature range is between 0° and −35° C., $CsCuCl_3 \cdot X(NH_3)$, wherein X is between 2 and 5 and said temperature range is between 0° and −55° C., $K_2FeCl_5 \cdot X(NH_3)$, wherein X is between 2 and 5 and said temperature range is between 0° and −55° C., $NH_4Cl \cdot X(NH_3)$, wherein X is between 0 and 3 and said temperature range is between 15° and −20° C., and $NaBr \cdot X(NH_3)$, wherein X is between 0 and 5.25 and said temperature range is between 15° and −15° C.

13. A method for storage and recovery of thermal energy using a system of claim 12 comprising charging said system using said compressor and drawing said ammonia from said complex compound and compressing said ammonia with said compressor.

14. A heat exchange system comprising a heat exchanger and a vessel containing a complex compound selected from the following complex compounds and wherein said complex compound is alternately heated and cooled to alternately desorb and adsorb, respectively, at least a portion of the ammonia moiety thereof between numerical limits and cause refrigerating ligand evaporation in the temperature range as follows:

$BeCl_2 19\ X(NH_3)$, wherein X is between 2 and 4 and said temperature range is between −10° and −65° C., $MgCl_2 \cdot X(NH_3)$, wherein X is between 2 and 6 and said temperature range is between 0° and −60° C., $MgBr_2 \cdot X(NH_3)$, wherein X is between 2 and 6 and said temperature range is between 0° and −65° C., $Mg(ClO_4)_2 \cdot X(NH_3)$, wherein X is between 0 and −6 and said temperature range is between 0° and −65° C., $Ca(ClO_4)_2 \cdot X(NH_3)$, wherein X is between 2 and 6 and said temperature range is between 0° and −45° C., $SrCl_2 \cdot X(NH_3)$, wherein X is between 1 and 8 and said temperature range is between 10° and −30° C., $Sr(ClO_2) \cdot X(NH_3)$, wherein X is between 0 and 6 and said temperature range is between 0° and −40° C., $BaBr_2 \cdot X(NH_3)$, wherein X is between 4 and 8 and said temperature range is between 10° and −30° C., $MnBr_2 \cdot X(NH_3)$, wherein X is between 2 and 6 and said temperature range is between 0° and −50° C., $FeBr_2 \cdot X(NH_3)$, wherein X is between 2 and 6 and said temperature range is between 0° and −50° C., $CoCl_2 \cdot X(NH_3)$, wherein X is between 2 and 6 and said temperature range is between 0° and −60° C., $CoBr_2 \cdot X(NH_3)$, wherein X is between 2 and 6 and said temperature range is between 0° and −60° C., $NiBr_2 \cdot X(NH_3)$, wherein X is between 2 and 6 and said temperature range is between 0° and −65° C., $Ni(ClO_3)_2 \cdot X(NH_3)$, wherein X is between 0 and 6 and said temperature range is between 0° and −40° C.,

*$CrCl_2 \cdot X(NH_3)$, wherein X is between 0 and 3 and between 3 and 6 and said temperature range is between 0° and −60° C.,*

*$CdBr_2 \cdot X(NH_3)$, wherein X is between 2 and 6 and said temperature range is between 0° and −40° C.,*

*$TaCl_5 \cdot X(NH_3)$, wherein X is between 0 and 7 and said temperature range is between 10° and −30° C.,*

*$ReCl_3 \cdot X(NH_3)$, wherein X is between 0 and 6 and said temperature range is between 5° and −40° C.,*

*$ReBr_3 \cdot X(NH_3)$, wherein X is between 0 and 7 and said temperature range is between 5° and −40° C.,*

*$SnCl_2 \cdot X(NH_3)$, wherein X is between 0 and 2.5 and said temperature range is between 0° and −60° C.,*

*$NH_4AlCl_4 \cdot X(NH_3)$, wherein X is between 0 and 6 and said temperature range is between 0° and −65° C.,*

*$NaAlCl_4 \cdot X(NH_3)$, wherein X is between 0 and 6 and said temperature range is between 0° and −65° C.,*

*$KAlCl_4 \cdot X(NH_3)$, wherein X is between 0 and 6 and said temperature range is between 0° and −65° C.,*

*$(NH_4)_2ZnCl_4 \cdot X(NH_3)$, wherein X is between 0 and 4 and said temperature range is between 0° and −60° C.,*

*$(NH_4)_3ZnCl_5 \cdot X(NH_3)$, wherein X is between 0 and 6 and said temperature range is between 0° and −45° C.,*

*$K_2ZnCl_4 \cdot X(NH_3)$, wherein X is between 0 and 5 and said temperature range is between 0° and −40° C.,*

*$K_2ZnCl_4 \cdot X(NH_3)$, wherein X is between 5 and 12 and said temperature range is between 0° and −35° C.,*

*$CsCuCl_3 \cdot X(NH_3)$, wherein X is between 2 and 5 and said temperature range is between 0° and −55° C.,*

*$K_2FeCl_5 \cdot X(NH_3)$, wherein X is between 2 and 5 and said temperature range is between 0° and −55° C.,*

*$NH_4Cl \cdot X(NH_3)$, wherein X is between 0 and 3 and said temperature range is between 15° and −20° C., and*

*$NaBr \cdot X(NH_3)$, wherein X is between 0 and 5.25 and said temperature range is between 15° and −15° C.*

*15. The system of claim 14 wherein said complex compound is $SrCl_2 \cdot XNH_3$* wherein X is between 1 and 8.

*16. The system of claim 14 wherein said complex compound is $SnCl_2 \cdot XNH_3$* wherein X is between 0 and 2.5.

*17. The system of claim 14 wherein said complex compound is $CoCl_2 \cdot XNH_3$* wherein X is between 2 and 6.

* * * * *